United States Patent [19]
Wirth

[11] 3,762,543
[45] Oct. 2, 1973

[54] DISK-PACK BOLT ASSEMBLY WITH ATTACHMENT INDICATOR

[75] Inventor: Wayne M. Wirth, St. Paul, Minn.

[73] Assignee: Minnesota Mining and Manufacturing Company, St. Paul, Minn.

[22] Filed: June 8, 1972

[21] Appl. No.: 260,887

Related U.S. Application Data

[63] Continuation of Ser. No. 50,439, June 29, 1970, abandoned.

[52] U.S. Cl. .......................... 206/62 P, 340/174.1 C
[51] Int. Cl. .............................................. G11b 1/02
[58] Field of Search .................................. 206/62 P; 340/174.1 C; 274/10, 41.4 M

[56] References Cited

UNITED STATES PATENTS

| | | | |
|---|---|---|---|
| 3,509,992 | 5/1970 | David et al | 340/174.1 C |
| 3,570,661 | 3/1961 | Kersh | 206/62 P |

*Primary Examiner*—Vincent P. Canney
*Attorney*—Alexander, Sell, Steldt & Delahunt

[57] ABSTRACT

A bolt assembly for attaching a disk-pack to the spindle of a drive unit. The bolt assembly has a movable rod which gives a visible indication when the disk-pack is properly secured to the spindle.

4 Claims, 2 Drawing Figures

Figure 1:
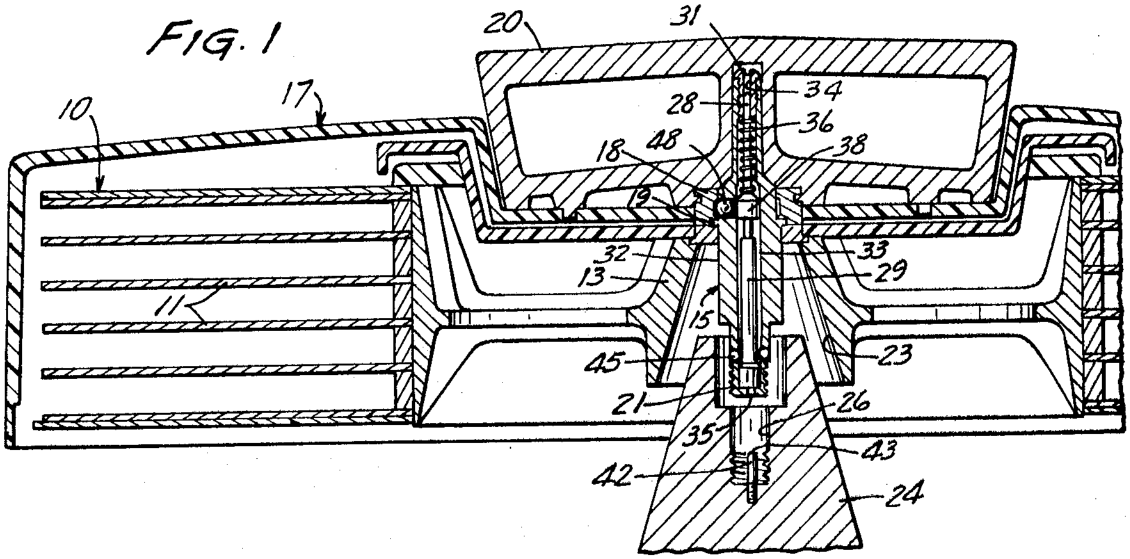

INVENTOR.
WAYNE M. WIRTH
BY Kinney, Alexander, Sell, Steldt & De La Hunt
ATTORNEYS

DISK-PACK BOLT ASSEMBLY WITH ATTACHMENT INDICATOR

This is a continuation of application Ser. No. 50,439 filed June 29, 1970 now abandoned.

FIELD OF THE INVENTION

This invention relates to disk-packs of the type used for magnetic recording of data from an electronic computer, and in one aspect relates to a device for indicating the proper attachment of a disk-pack to a drive-unit.

BACKGROUND OF THE INVENTION

The disk-pack is widely used as an information storage device for an electronic computer. In a disk-pack, information is stored in concentric rings in the magnetizable coating on metallic disks which are supported in parallel vertically spaced coaxial relationship by a common hub. The drive-unit rotates the carefully balanced disk-pack at speeds on the order of 1800 to 3600 rpm and provides magnetic heads which "fly" along concentric rings on cushions of air above the disks and also move radially of the disks to store or retrieve information.

To provide for interchangeability, the disk-pack is mounted upon a conical spindle of a drive-unit which mates with the hub of the disk-pack. The disk-pack is secured by a bolt assembly rotatably mounted on the disk-pack hub which has a double lead thread to engage a mating thread tapped in the center of the spindle.

A disk-pack removed from the drive-unit is usually placed in a dust-tight storage container. One type of container which is commonly used in industry and which utilizes a disk-pack bolt assembly which affords means for release or retention of the container cover is shown in U. S. Pat. No. 3,465,875. The handle on the cover of the container serves as a convenient wrench for tightening the disk-pack upon the drive-unit. There is, however, no reliable way of determining when the disk-pack has been properly secured to the spindle of the drive-unit. If an operator does not properly feel the amount of torque required, the disk-pack may not be properly secured to the spindle. The resulting looseness between the spindle and the hub of the disk-pack may result in vibrations which at the least may cause the heads to track improperly or in a more severe case may cause a magnetic head to gouge a disk. Subsequent repair of the head may cause loss of valuable computer operation time, and the damaged disk may have to be replaced.

BRIEF SUMMARY OF THE INVENTION

The present invention provides a bolt assembly which affords the operator an easy visual check to determine if a disk-pack is properly secured to a spindle on a drive-unit. Slidably mounted within the bolt of the bolt assembly is an indicating rod which will be moved against the bias of a spring upon attachment to the spindle and upon reaching a predetermined position will visually indicate that the disk-pack is properly secured to the drive-unit. The aforementioned bolt assembly for disk-pack devices described in U.S. Pat. No. 3,465,875 is easily modified to incorporate the indicating device of the present invention.

Figure 2:
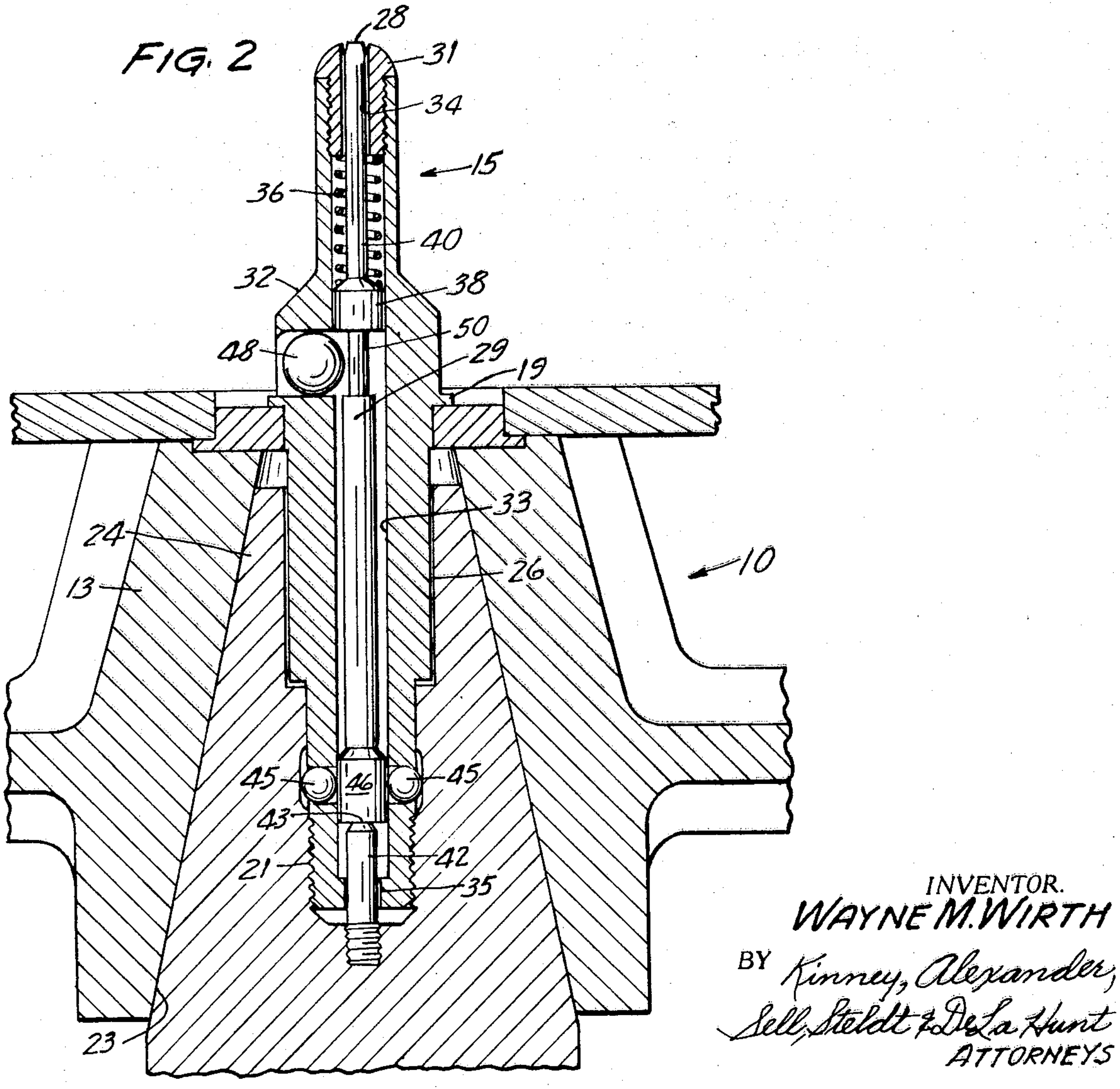

The invention will further be described with reference to the accompanying drawings wherein like members refer to like parts in the several views, and wherein:

FIG. 1 is a vertical fragmentary view in section of a disk-pack utilizing the present invention, which disk-pack has a cover and is suspended above a spindle for receiving the disk-pack; and FIG. 2 is an enlarged vertical fragmentary view in central section of the bolt assembly portion of the embodiment of the present invention shown in FIG. 1 wherein the disk-pack has been properly secured to the spindle and the cover has been removed.

Referring now to FIG. 1, there is shown a disk-pack 10 comprising a set of disks 11 supported on a central hub 13 in which a bolt assembly 15 is journalled. The disk pack 10 is coupled by the bolt assembly 15 to a cover 17 and has been disconnected from a base (not shown) to which it was fastened by the bolt assembly 15. The cover 17 and the base together provide a dust-tight storage container of the type shown in U.S. Pat. No. 3,465,875. The cover 17 has a handle 20 attached to a socket 18 which mates with a hex-shaped protrusion 19 formed on the bolt assembly 15.

In FIG. 1, the disk-pack 10 and cover 17 are shown suspended over the conical spindle 24 of a drive unit (other parts not shown). The inner surface 23 of the hub 13 is conical to fit with the conical spindle 24. The disk-pack 10 may be attached to the spindle 24 when the disk-pack 10 is lowered into place by rotating the handle 20 to engage a threaded portion 21 of the bolt assembly 15 with a tapped portion of a hole 26 in the spindle 24. After the bolt assembly 15 has at least partially engaged with the spindle 24, the cover 17 is uncoupled and removed from the bolt assembly 15 by means to be described later.

Turning now to FIG. 2, there is shown the bolt assembly 15 attaching the disk-pack 10 to the spindle 24 after the cover 17 has been removed. The bolt assembly 15 is indicating sufficient engagement by the position of an end surface 28 of a rod 29 with respect to the surface of a screw 31.

The means in the bolt assembly 15 which afford the indication of sufficient engagement of the bolt assembly 15 with the spindle 24 may be seen in FIGS. 1 and 2. A bolt 32 of the bolt assembly 15 is formed with an orifice 33 which is concentric with and extends the length of the bolt 32. Slidably mounted in the orifice 33 is the stepped rod 29. Before the disk-pack is attached to the spindle, the rod 29 is urged toward a first position against a constricted section 35 of the orifice 33 by spring means illustrated as a spring 36. The spring 36 is positioned between an enlarged section 38 of the rod 29 and the screw 31 which is attached by threads in the orifice 33 to form a portion of the bolt 32. The screw 31 is also formed with a central orifice 34 which is concentric with the orifice 33 so that a slender section 40 of the rod 29 which passes through the center of the spring 36 may be moved upon attachment of the disk-pack to the spindle to a second position at which the end surface 28 of the rod 29 is flush with the uppermost surface of the screw 31. The end surface 28 of the rod 29 is colored such as with red paint to contrast with the surface of the screw 31 so that the position of the surface 28 with respect to the surface of the screw 31 may be easily seen.

Means are provided to move the rod 29 to the second position at which it indicates that the disk-pack 10 is properly secured to the spindle 24 by the bolt assembly 15. When the bolt assembly 15 is engaged with the hole 26 in the spindle 24, the end of the rod 29 is contacted by a pin 42 positioned in the bottom of the hole 26. The pin 42 has an end surface 43 at a predetermined location with respect to the spindle 24. The pin 42 is properly sized and positioned to enter the constricted section 35 of the orifice 33 so that the rod 29 will be prevented from moving with the bolt 32 toward the bottom of the hole 26 against the bias of the spring 36. The dimensions of the various components are such that the rod 29 will be positioned in its second position when the bolt 32 is sufficiently engaged with the spindle so that a disk-pack 10 is properly secured to the spindle 24. Thus, when the end surface 28 of the rod 29 is not positioned flush with the surface of the screw 31 after an operator has attached the disk-pack 10 to a drive-unit the operator may easily note this fact and may further tighten the bolt assembly 15.

Means for coupling and uncoupling the cover 17 and the base (not shown) of the previously mentioned dust-tight storage container are also provided on the bolt assembly 15. These means are not a part of the present invention, but are included in the bolt assembly 15 to afford the use of the dust-tight storage container in conjunction with a bolt assembly 15 incorporating the present invention. For coupling the base of the dust-tight storage container to the bolt assembly 15 a pair of steel balls 45 retained in radially extending apertures in the lower portion of the bolt 32 together with a stepped cam portion 46 of the rod 29 provide part of a mechanism described in U.S. Pat. No. 3,465,875.

For coupling the socket 18 of the cover 20 to the bolt assembly 15, U.S. Pat. No. 3,462,875 also teaches the use of three steel balls 48 retained in equally spaced radially extending apertures formed in the bolt 32 together with the enlarged section 38 of the rod 29. When the rod 29 is in the first position, the section 38 of the rod 29 holds the balls 48 outwardly so that a portion of each ball 48 extends beyond the surface of the bolt 32 and into a groove in the socket 18 as shown in FIG. 1 so that the cover 17 may not be removed. When the rod 29 is moved to its second position upon attachment of the bolt assembly 15 to the spindle 24, the section 38 moves out of alignment with the balls 48 as is shown in FIG. 2. The balls 48 may then retract into a slender portion 50 of the rod 29 to permit the cover and its socket 18 to slide upwardly and off the bolt assembly 15.

The bolt assembly 15 of the present invention is balanced about its axis because the screw 31, spring 36, and rod 38 of the bolt assembly 15 are balanced about their axes and are coaxially positioned within the concentric bolt 32. Additionally, the balls 48 and 45 which form a part of the means for coupling and uncoupling the cover 17 and base of the dust-tight cover are spaced about the bolt 32 so that the balance of the bolt assembly is maintained.

Having thus described the present invention with reference to preferred embodiment, what is claimed is:

1. In a disk pack assembly including a plurality of circular magnetically coated disks mounted in spaced coaxial relationship on a hub adapted for engagement with a spindle of a disk-drive having a tapped hole and a surface at a predetermined location with respect to the spindle, and a bolt assembly for attaching said hub to said spindle comprising:

a bolt rotatably mounted in said hub having an axially extending orifice, means adapted for engagement to rotate said bolt, and an externally threaded end portion adapted upon rotation of said bolt for engagement with the tapped hole of a said spindle to attach said hub to the spindle;

a rod slidably retained within said orifice and movable between a first position and a second position with respect to said bolt; and spring means for urging said rod to said first position, said rod being adapted for engagement with the surface on a said spindle during engagement of the threaded end portion of said bolt with the tapped hole in the spindle to move the rod in opposition to said spring means toward said second position and to said second position upon a sufficient depth of engagement between said bolt and the tapped hole in the spindle to properly attach said disk pack assembly thereto, the improvement wherein said axially extending orifice extends through the end of said bolt opposite said threaded end portion, and said rod in said second position is in a predetermined visual relationship with the end of said bolt opposite said threaded end portion to indicate said sufficient depth of engagement between said bolt and a said spindle to properly attach said disk pack assembly to the spindle.

2. A disk pack assembly according to claim 1, wherein said second position of said rod is indicated by alignment of an end of said rod with the end of said bolt opposite said threaded end portion.

3. A disk pack assembly according to claim 2, wherein said end of the rod is colored to contrast with the color of the bolt to aid in visually noting that the rod is in said second position.

4. A disk pack assembly according to claim 1, wherein said hub, said disks, said bolt, said rod, and said spring means each is formed with an axis of symmetry and said axes are coaxially positioned to provide a balanced disk pack assembly.

* * * * *